United States Patent
Khaydarov et al.

(10) Patent No.: US 11,868,032 B2
(45) Date of Patent: Jan. 9, 2024

(54) PROJECTOR AND METHOD FOR INCREASING PROJECTED LIGHT INTENSITY

(71) Applicant: DOLBY LABORATORIES LICENSING CORPORATION, San Francisco, CA (US)

(72) Inventors: Dzhakhangir V. Khaydarov, Campbell, CA (US); Douglas J. Gorny, San Francisco, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 17/423,685

(22) PCT Filed: Jan. 16, 2020

(86) PCT No.: PCT/US2020/013946
§ 371 (c)(1),
(2) Date: Jul. 16, 2021

(87) PCT Pub. No.: WO2020/150520
PCT Pub. Date: Jul. 23, 2020

(65) Prior Publication Data
US 2022/0091489 A1    Mar. 24, 2022

Related U.S. Application Data

(60) Provisional application No. 62/793,797, filed on Jan. 17, 2019.

(30) Foreign Application Priority Data

Apr. 15, 2019    (EP) .................................. 19169217

(51) Int. Cl.
G03B 21/20    (2006.01)
H04N 9/31    (2006.01)
(Continued)

(52) U.S. Cl.
CPC ....... G03B 21/142 (2013.01); G02B 27/0972 (2013.01); G03B 21/208 (2013.01); G03B 21/28 (2013.01)

(58) Field of Classification Search
CPC ................ G03B 21/208; G03B 21/142; G02B 27/0972; H04N 9/3152
See application file for complete search history.

(56) References Cited

U.S. PATENT DOCUMENTS 3,814,945 A    6/1974    Allnutt
4,580,879 A    4/1986    Wilson
(Continued)

FOREIGN PATENT DOCUMENTS

CN    102830578 B    12/2012
CN    103033930 A    4/2013
(Continued)

OTHER PUBLICATIONS

Brennesholtz and Stupp, Projection displays. J. Wiley and Sons, 2008.
(Continued)

*Primary Examiner* — Ryan D Howard
(74) *Attorney, Agent, or Firm* — Michael Best & Friedrich LLP

(57)    ABSTRACT

A projector includes a light source, an integrating rod, an image panel, a beam shaper, and an actuator mechanically connected to the beam shaper. The image panel is configured to display an image at a displayed aspect ratio. The beam shaper includes multiple prisms shaped and oriented such that when the beam shaper intersects an optical path of the
(Continued)

illumination between the integrating rod and the image panel, the illumination transmitted by the beam shaper is collinear with the illumination incident on the beam shaper. The actuator is configured to switch the projector between (i) a first configuration, in which the beam shaper does not change an aspect ratio of the illumination, and (ii) a second configuration, in which the beam shaper intersects the optical path between the integrating rod and the image panel and changes the aspect ratio of the illumination.

14 Claims, 7 Drawing Sheets

(51) Int. Cl.
G03B 21/14 (2006.01)
G02B 27/09 (2006.01)
G03B 21/28 (2006.01)

(56) References Cited

U.S. PATENT DOCUMENTS

| | | | |
|---|---|---|---|
| 4,822,151 | A | 4/1989 | Tatsuno |
| 6,587,159 | B1 | 7/2003 | Dewald |
| 7,102,833 | B2 | 9/2006 | Cole |
| 7,163,299 | B2 | 1/2007 | Lee |
| 7,168,810 | B2 | 1/2007 | Peterson |
| 7,206,133 | B2 | 4/2007 | Cassarly |
| 7,387,389 | B2 | 6/2008 | Gupta |
| 7,889,430 | B2 | 2/2011 | El-Ghoroury |
| 8,702,239 | B2 | 4/2014 | Olsen |
| 9,500,941 | B2 | 11/2016 | Koichi |
| 2005/0168704 | A1 | 8/2005 | Gupta |
| 2006/0274278 | A1 | 12/2006 | Lee |
| 2007/0081257 | A1 | 4/2007 | Bowron |
| 2010/0254022 | A1 | 10/2010 | O'Shaughnessy |
| 2011/0199586 | A1 | 8/2011 | Morikuni |
| 2012/0320347 | A1 | 12/2012 | Morikuni |
| 2015/0237319 | A1 | 8/2015 | Tsai |
| 2018/0209915 | A1 | 7/2018 | Feldman |

FOREIGN PATENT DOCUMENTS

| | | |
|---|---|---|
| CN | 108345104 B | 7/2018 |
| DE | 2211477 A1 | 11/1972 |
| EP | 0363666 A2 | 4/1990 |
| EP | 0312652 B1 | 9/1993 |
| EP | 30513441 A | 8/2016 |
| GB | 2430272 A | 3/2007 |
| GN | 103913852 A | 7/2014 |
| JP | 2011164450 A | 8/2011 |
| JP | 2013020231 A | 1/2013 |
| JP | 2017111287 A | 6/2017 |
| WO | 1985001119 A1 | 3/1985 |

OTHER PUBLICATIONS

J.R.M. Barr, "Achromatic Prism Beam Expanders", Optics Communications 51, 41-46 (1984).
Kasuya, T. et al. "A Prism Anamorphic System for Gaussian Beam Expander", Applied Physics 17, 131-136 (1978).
Powell, I. "Variable anamorphic lens for a 35-mm SLR", Applied Optics 22, 3249-3257 (1983).
R. Trebino, "Achromatic N-prism beam expanders: optimal configurations", Applied Optics 24, 1130-1138 (1985).
RealTime Board, https://realtimeboard.com/features.

US 11,868,032 B2

PROJECTOR AND METHOD FOR INCREASING PROJECTED LIGHT INTENSITY

TECHNICAL FIELD

Embodiments of the present invention relate to image projectors, particularly to increasing brightness of projected images.

BACKGROUND

Image projectors are configured to generate illumination and project illumination on a projection surface, such as a screen. Image projectors produce images on the projection surface by receiving image data and, according to the image data, spatially modulating intensity and color of the illumination. Quality of projected images depends in part on the peak intensity of the spatially modulated illumination.

SUMMARY OF THE EMBODIMENTS

In a first aspect, a projector includes a light source, an integrating rod, an image panel, a beam shaper, and an actuator mechanically connected to the beam shaper. The light source is configured to generate illumination. The integrating rod has a rod aspect ratio at a first end. The image panel is configured to display an image at a displayed aspect ratio. The beam shaper includes multiple prisms shaped and oriented such that when the beam shaper intersects an optical path of the illumination between the integrating rod and the image panel, the illumination transmitted by the beam shaper is collinear with the illumination incident on the beam shaper. The actuator is configured to switch the projector between (i) a first configuration, in which the beam shaper does not change an aspect ratio of the illumination, and (ii) a second configuration, in which the beam shaper intersects the optical path between the integrating rod and the image panel and changes the aspect ratio of the illumination. The illumination transmitted by the beam shaper may have an aspect ratio equal to the displayed aspect ratio, which increases the intensity of illumination incident on the displayed image.

In a second aspect, a projector includes a light source, a delay line including multiple prisms, and an actuator mechanically connected to a first prism of the multiple prisms. The light source is configured to generate illumination propagating along an optical path. The delay line intersects the optical path and including multiple prisms shaped and oriented such that the illumination transmitted by the beam shaper is (i) collinear with the illumination incident on the beam shaper and (ii) magnified by a near-unity factor M, where |1−M|<0.1. The actuator is configured to change the optical path length through the delay line by translating the first prism in a direction that is (i) perpendicular to the optical path within the delay line and (ii) in a plane perpendicular to refractive surfaces of the multiple prisms direction perpendicular to the common optical axis.

The delay line hence enables precise focusing of the illumination on an image panel or display screen without significantly changing shape or size of the illumination.

In a third aspect, a method for increasing projected light intensity of a projector is disclosed. The method may be executed when illumination exiting an integrating rod of the projector, having a rod aspect ratio, is incident on an image panel displaying video data at a first displayed aspect ratio that differs from the rod aspect ratio. The method includes changing an aspect ratio of the illumination to match the first displayed aspect ratio by, in a plane perpendicular to a plane of the displayed video data, refracting the illumination at a plurality of planar surfaces. The third aspect and the first aspect have similar technical benefits.

DETAILED DESCRIPTION OF THE EMBODIMENTS

Figure 1:
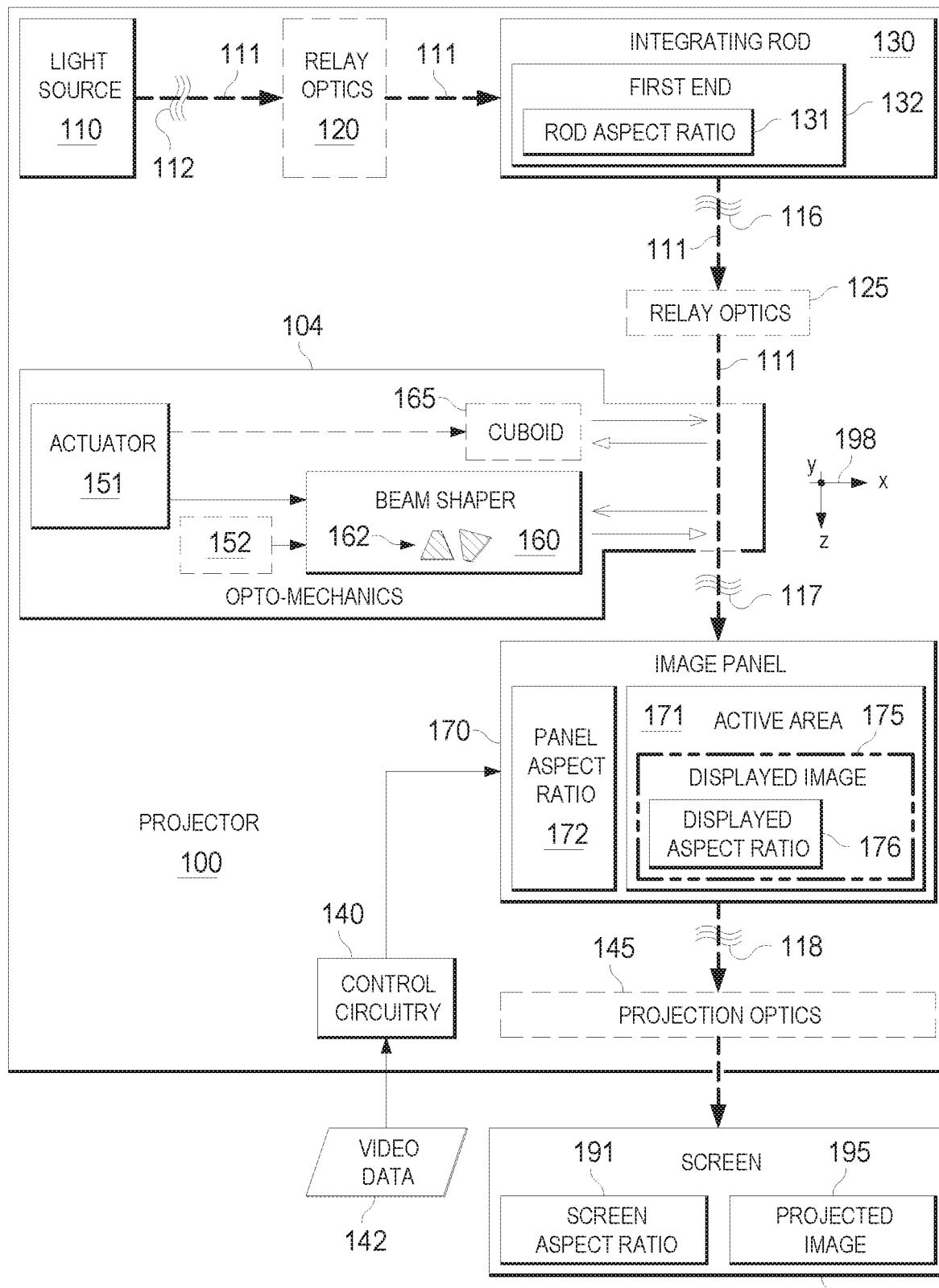
FIG. 1 is a schematic diagram of a projector configured to project an image on a screen, in an embodiment.

FIG. 1 is a schematic diagram of a projector 100 configured to project a projected image 195 on a screen 190. Projector 100 includes at least one of opto-mechanics 104, a light source 110, an integrating rod 130, control circuitry 140, and an image panel 170. Integrating rod 130 has a first end 132, proximate image panel 170, that may have rectangular cross-section and have a rod aspect ratio 131. Opto-mechanics 104 includes a beam shaper 160 and an actuator 151. Projector 100 may also include at least one of relay optics 120, relay optics 125, and projection optics 145.

Control circuitry 140 receives video data 142. Image panel 170 has an active area 171 that is configured to display a displayed image 175 of video data 142. Active area 171 and displayed image 175 have respective aspect ratios 172 and 176, which are hereinafter also referred to as panel aspect ratio 172 and displayed aspect ratio 176. Displayed aspect ratio 176 may equal panel aspect ratio 172, in which case panel image 175 may completely fill active area 171. Rod aspect ratio 131 may equal panel aspect ratio 172.

The display format of video data 142 may determine displayed aspect ratio 176, which may be stored as metadata of video data 142. Candidate display formats include DCI (2K/4K) and wide screen ("scope"), which have respective aspect ratios 1.90:1 and 2.39:1.

Light source 110 is configured to generate illumination 112, which propagates along a beam path 111 from light source 110 and through integrating rod 130. Illumination 112 exits integrating rod 130 at first end 132 as illumination 116, which has an aspect ratio equal to rod aspect ratio 131. Hence, illumination 116 may have an aspect ratio equal to panel aspect ratio 172. First end 132 may be a planar surface that is parallel to the x-y plane, or may be a non-planar surface having a symmetry axis normal to the x-y plane.

Integrating rod 130 spatially homogenizes the optical intensity of illumination 112 such that illumination 116 exiting first end 132 has sufficiently uniform illumination, in a plane orthogonal the beam path 111, when it reaches active area 171 of image panel 170. To this end, integrating rod may have a normalized length $L_n \geq 4$, which allows for a sufficient number of total-internal-reflections in integrating rod 130 to ensure an edge-to-center intensity ratio of approximately 0.8. (Brennesholtz and Stupp, *Projection displays*. J. Wiley and Sons, 2008.) Normalized length $L_n$ is a function of geometrical length L, numerical aperture NA, refractive index $n_1$, and cross-sectional area A of integrating rod 130: $L_n=(L \cdot NA)/(n_1 \cdot \sqrt{A})$.

Relay optics 120 may steer illumination 112 along beam path 111 between light source 110 and integrating rod 130. Relay optics 125 may steer illumination 116 along beam path 111 between integrating rod 130 and image panel 170. Each of relay optics 120 and 125 may include at least one lens and/or at least one mirror. Relay optics 125 may magnify illumination 116 while not changing the aspect ratio of illumination 116. Herein, magnification includes demagnification, that is, when magnification factor M is less than one.

Illumination 116 that is incident on image panel 170 is denoted herein as panel illumination 117. Panel illumination 117 may have the same aspect ratio as illumination 116, for example, when beam shaper 160 is not in beam path 111. Illumination 116 and panel illumination 117 may have a common primary propagation direction, which defines a z direction of a coordinate system 198, Herein and unless stated otherwise, references to directions or planes denoted by at least one of x, y, or z refer to coordinate system 198.

Image panel 170 generates illumination 118 by modulating panel illumination 117 according to panel image 175. Projector 100 projects illumination 118 to screen 190 such that screen 190 displays projected image 195. Image panel 170 may generate modulated illumination 118 by either transmitting or reflecting panel illumination 117. For example, image panel 170 may be a spatial light modulator, a reflective light valve, a transmissive light valve, or a MEMS array.

The quality of projected image 195 depends in part on its dynamic range, which depends on the intensity of panel illumination 117 on displayed image 175. This intensity is below its peak attainable value when the aspect ratio of panel illumination 117 does not match displayed aspect ratio 176 of displayed image 175.

Figure 2:
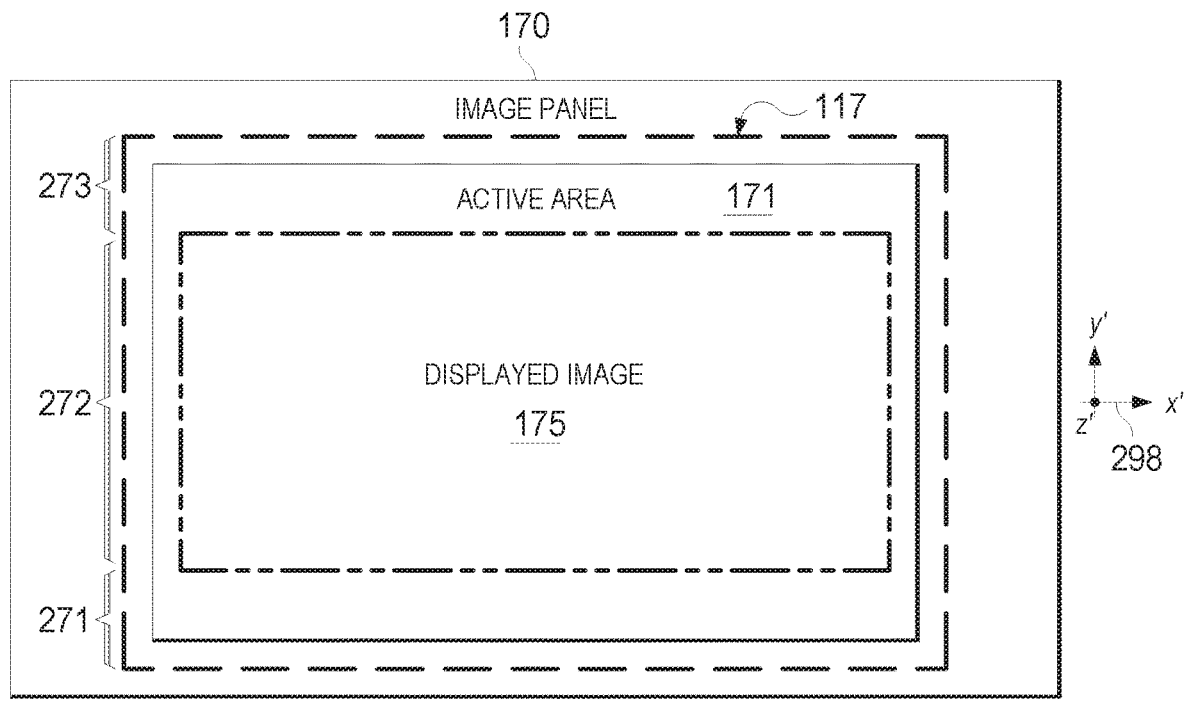
FIG. 2 is a schematic plan view of an image panel of the FIG. 1 projector, in an embodiment.

FIG. 2 is a schematic plan view of image panel 170 displaying image 175 and illuminated by panel illumination 117. The plan view of FIG. 2 is in the x'-y' plane of a coordinate system 298 that designates directions x', y', and z'. Coordinate system 298 may be rotated with respect to coordinate system 198. For example, directions y and y' may be parallel and the x'-y' plane may be oriented at an angle, with respect to the x-y plane, in the range of zero to ninety degrees, 45° for example. In FIG. 2, active area 171, displayed image 175, and panel illumination 117 are depicted with a solid line, a dotted line, and a dashed line, respectively. In the example of FIG. 2, the aspect ratio of panel illumination 117 equals panel aspect ratio 172, and does not equal displayed aspect ratio 176.

FIG. 2 denotes three regions of active area 171: a bottom region 271, a middle region 272, and a top region 273. In the example of FIG. 2, displayed image 175 is part of video data, e.g., a movie, formatted with an aspect ratio that exceeds that of active area 171, such that displayed aspect ratio 176 exceeds panel aspect ratio 172. In such an operating scenario, at least one of top region 271 and bottom region 273 does not display part of displayed image 175. Since the aspect ratio of panel illumination 117 does not equal displayed aspect ratio 176, part of panel illumination 117 is incident on regions 271 and 273, which do not display parts of displayed image 175. Hence, panel illumination 117 incident on regions 271 and 273 does not contribute to the intensity of projected image 195, which results in lower dynamic range and hence suboptimal image quality.

Herein, illumination efficiency is a ratio of the area panel illumination 117 that illuminates displayed image 175 to the total cross-sectional area of panel illumination 117 incident on image panel 170. Actuator 151 and beam shaper 160 remedy image quality degradation by shaping illumination 116 such that the aspect ratio of panel illumination 117 (incident on image panel 170) equals displayed aspect ratio 176. Such beam shaping increases illumination efficiency.

Beam shaper 160 includes multiple prisms 162 that may be collinearly aligned such that a respective front surface and a respective rear surface of each of the multiple prisms is perpendicular to a common plane, such as the y-z plane. Prisms 162 may be shaped and oriented to change the aspect ratio of light axially propagating therethrough, illumination 116 for example, while neither changing the light's propagation direction nor laterally displacing the light.

Actuator 151 is mechanically connected to beam shaper 160 and is configured to switch projector 100 between a first configuration and a second configuration. In the first configuration, beam shaper 160 does not change the aspect ratio of illumination 116, for example, by either not being in beam path 111 or being in beam path 111 with prisms 162 configured to refract light while not changing the aspect ratio of illumination 116. In such a configuration, the aspect ratio of illumination 116 equals that of panel illumination 117. In the second configuration, and along beam path 111, beam shaper 160 is between integrating rod 130 and image panel 170, and the prisms 162 are oriented to change the aspect ratio of light axially propagating therethrough, such as illumination 116. In such a configuration, the aspect ratio of illumination 116 differs from that of panel illumination 117.

Prisms 162 may be shaped and oriented to impose a unidirectional magnification M on illumination 116 axially propagating therethrough and, in the second configuration, $|1-M| \geq 0.1$. A unidirectional magnification refers to a change a spatial dimension, e.g., width or height, in one and only direction (e.g., x or y) in a plane perpendicular to beam path 111. The unidirectional magnification M may be variable as a function of an orientation of at least one prism of prisms 162 and, in the first configuration: (i) $|1-M| < 0.1$ and (ii) along beam path 111, beam shaper 160 is between integrating rod 130 and the image panel 170. Unidirectional magnification M may be equal to displayed aspect ratio 176 divided by rod aspect ratio 131.

In an embodiment of projector 100, beam shaper 160 is outside of beam path 111 in the first configuration, whereas, in the second configuration, illumination 116 traverses a respective optical path length through each prism 162. In this embodiment, opto-mechanics 104 includes a transparent cuboid 165 having a length L along beam path 111, between a front surface and a rear surface thereof, and refractive index n such that optical path length nL equals a sum of the respective optical path lengths through each prism of prisms 162. Actuator 151 is mechanically connected to transparent cuboid 165 such that in the first configuration, beam path 111 traverses transparent cuboid 165 and may be orthogonal to the front surface and the rear surface. The respective optical path lengths and the refractive index n may correspond to one or more wavelengths of illumination 116.

Actuator 151 may be configured to switch projector 100 between the first configuration and the second configuration by moving at least one of cuboid 165 and beam shaper 160 in non-linear trajectory corresponding to a shape, such as circle or an ellipse, that intersects beam path 111. Actuator 151 may be configured to switch projector 100 between the first configuration and the second configuration by moving cuboid 165 and beam shaper 160 in a linear trajectory intersected by beam path 111. The non-linear trajectory and the linear trajectory may be in a plane parallel to the x-y plane.

Figure 3:
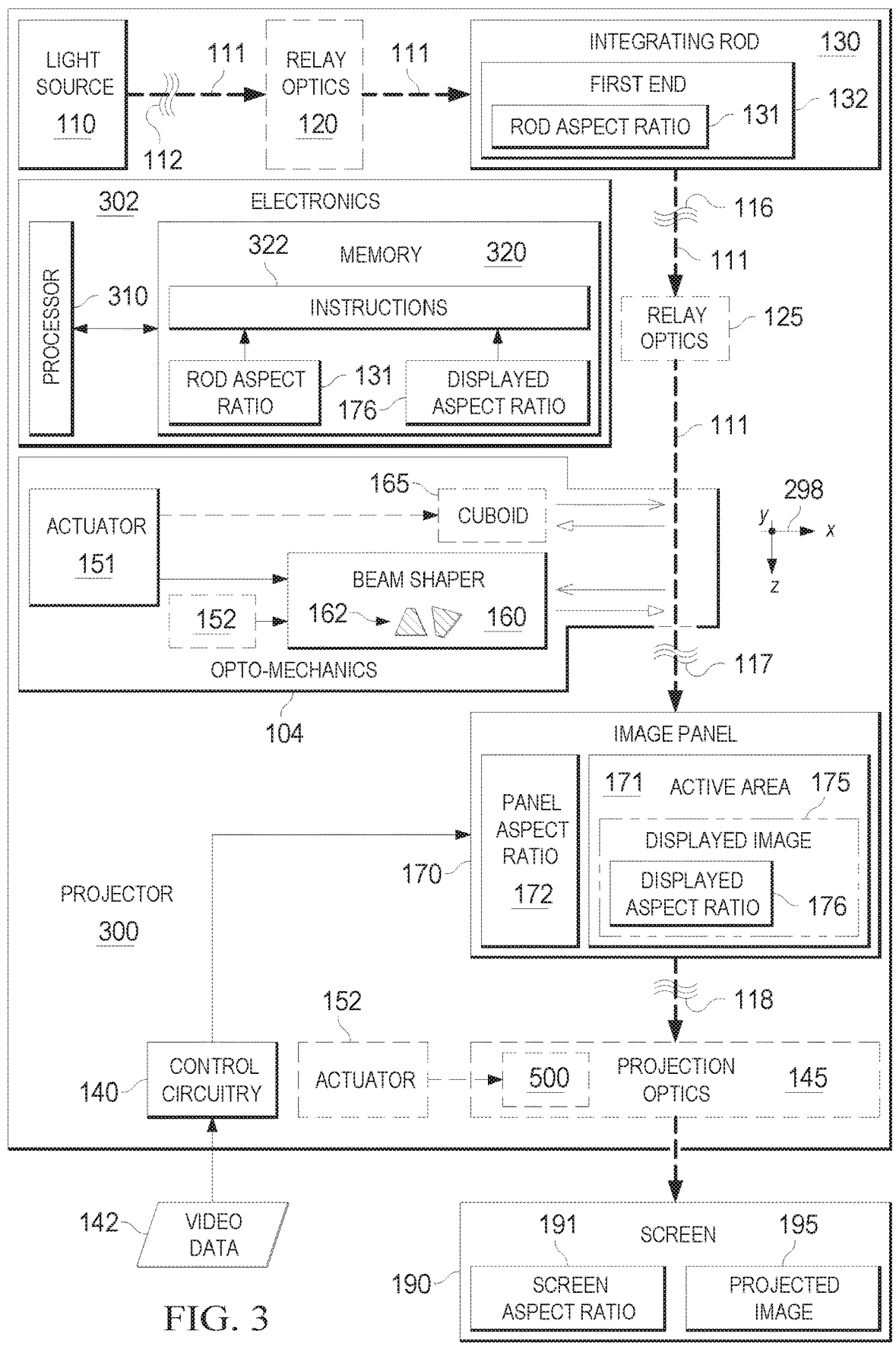
FIG. 3 is a schematic diagram of a projector, which is an example of the FIG. 1 projector that includes electronically controlled opto-mechanics, in an embodiment.

FIG. 3 is a schematic diagram of a projector 300, which is an example of projector 100 that includes electronics 302. Electronics 302 includes a processor 310 coupled to actuator 151 and a memory 320 communicatively coupled to processor 310. Functionality and hardware of control circuitry 140 may be included in at least one of processor 310 and memory 320. Electronics 302 may also include control circuitry 140, which may be communicatively coupled to at least one of processor 310 and memory 320.

Memory 320 may store rod aspect ratio 131 and displayed aspect ratio 176, and may receive displayed aspect ratio 176 as part of video data 142. Memory 320 stores machine-readable instructions 322, e.g., software, that, when executed by processor 310, control actuator 151 to: (a) put projector 300 in the first configuration when rod aspect ratio 131 equals displayed aspect ratio 176, and (b) put projector 300 in the second configuration when rod aspect ratio 131 differs from displayed aspect ratio 176.

Memory 320 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 320 may be integrated into processor 310.

Figure 4:
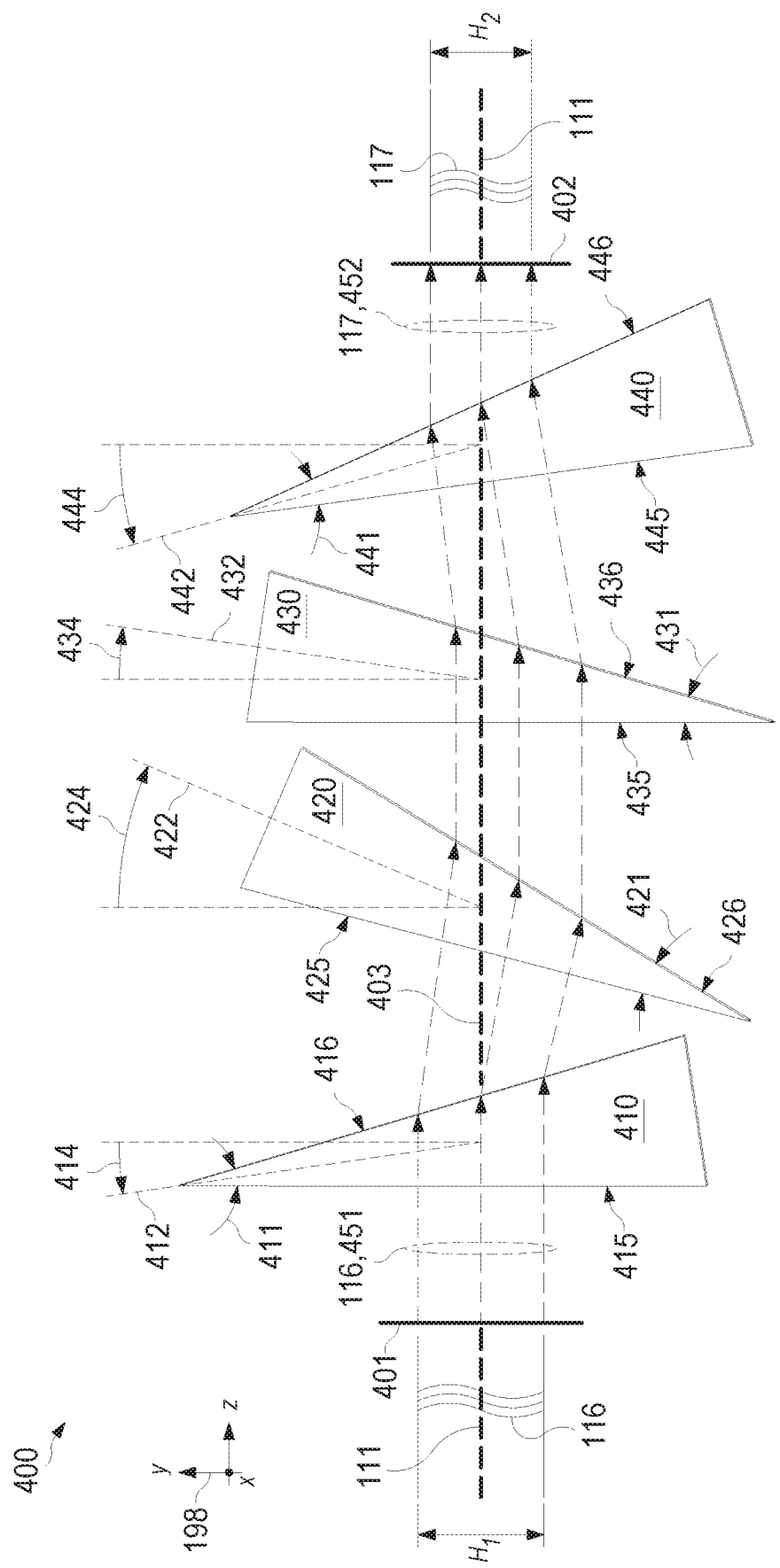
FIG. 4 is a cross-sectional schematic of illumination incident on an example beam shaper of the projector of FIG. 1.

FIG. 4 is a cross-sectional schematic of illumination 116 incident on a beam shaper 400, which transmits panel illumination 117. The cross-section of FIG. 4 is in the x-z plane of coordinate system 198. Beam shaper 400 is an example of beam shaper 160. Beam shaper 400 includes at least three of prisms 410, 420, 430, and 440, which together are an example of prisms 162 of beam shaper 160. Beam shaper 400 may include three prisms in total, as three non-identical prisms are sufficient for panel illumination 117 to be collinear with illumination 116, such that use of beam shaper 400 does not require that projector 100 include additional optical components to compensate for noncollinearity of illumination 116 and illumination 117. However, four identical prisms are sufficient for achieving said collinearity, and, for high-volume production, are less expensive than three non-identical prisms. Without departing from the scope of the embodiments, beam shaper 400 may include fewer than or more than four prisms, and may also include additional optical components.

Prisms 410-440 have respective front facets 415, 425, 435, and 445; prisms 411-440 have respective rear facets 416, 426, 436, and 446. In the x direction, illumination 116 has an input height $H_1$, and is transmitted as panel illumination 117, which has an output height $H_2=M_yH_1$, where $M_y$ is magnification in the y direction. Beam shaper 400 is between planes 401 and 402, between which illumination is represented by rays 451 and 452. Rays 451 represent illumination 116 between plane 401 and rear facet 446; rays 452 represent panel illumination 117 between rear facet 446 and plane 402. Each of front facets 415-445 and rear facets 416-446 may be orthogonal to the y-z plane.

Beam shaper 400 may have an optical axis 403 that intersects prisms 410 and 440. Optical axis 403 may intersect each prism 410-440. Beam path 111 is collinear with optical axis 403 at both an input plane 401 and an output plane 402, such that panel illumination 117 is collinear to illumination 116. Between prisms 420 and 430, rays 451 may be parallel to optical axis 403. Illumination 116 may be normally incident on at least one of facets 415, 425, 435, and 445. Illumination 116 being normally incident on front facet 415 of prism 410 facilitates alignment of beam shaper 400 using a portion of illumination 116 reflected by front facet 415. Panel illumination 117 may be collinear to illumination 116 to within a tolerance of two degrees.

Prisms 410-440 have respective apex angles 411, 421, 431, and 441, each of which are bisected by respective symmetry axes 412, 422, 432, and 442. Apexes of prisms 410 and 440 point upward, that is, they are on the same side of optical axis 403 and point in a direction having a positive y component. Apexes of prisms 420 and 430 point downward, that is, are on the opposite side of optical axis 403 point in a direction having a negative y component. While prisms 410-440 are illustrated as having triangular cross-sections, any of prisms 410-440 may have a trapezoidal cross-section without departing from the scope of the present embodiments.

Angular orientations of prisms 410-440 may be described by respective tilt angles 414, 424, 434, and 444 of symmetry axes 412-442 with respect to the x-y plane, which is perpendicular to optical axis 403. In the configuration of prisms 410-440 shown in FIG. 4, tilt angles 414 and 444 are negative while tilt angles 424 and 434 are positive. Tilt angles 414, 424, 434, and 444 may have different signs depending on desired magnification to be imparted by beam shaper 400. The absolute value of tilt angle 414 may equal one-half of apex angle 411, which results in illumination 116 being normally incident on front facet 415 of prism 410.

Each prism 410-440 may be formed from fused silica or borosilicate glass, and may have a refractive index n at visible electromagnetic wavelengths, hereinafter $n_{vis}$, is between 1.45 and 1.47. In an embodiment, each of prisms 410-440 are identical, e.g., in shape, material, and refractive index. Each apex angle 411-441 may be equal and be between sixteen and eighteen degrees.

Configuring beam shaper 400 to have a magnification $M_y$ equal to rod aspect ratio 131 divided by displayed aspect ratio 176 significantly increases the maximum intensity, and hence dynamic range, of projected image 195. For example, a video resolution 4096×1716 has an aspect ratio equal to 2.39 ("scope"), while a video resolution of 4096×2160 has an aspect ratio equal to 1.9 ("flat"), which is eight-tenths of 2.39. Rod aspect ratio 131 and panel aspect ratio 172 may both equal 1.9, for example, when projector 100 is designed for a 4096×2160 display resolution. When image panel 170 displays displayed image 175 with displayed aspect ratio 176 equal to 2.39, illumination 116 is too tall in the y direction (compared to its width in the x direction), as its aspect ratio is smaller. Hence, an advantageous magnification $M_y$ is the rod aspect ratio 131 divided by displayed aspect ratio 176 ($M_y$=0.8), such that beam shaper 400 scales the height of illumination 116 (y direction) by $M_y$=0.8.

Such scaling results in the aspect ratio of panel illumination 117 matching displayed aspect ratio 176. When each apex angle 411-441 equals seventeen degrees and $1.45<n_{vis}<1.47$, $H_2=0.8H_1$ can be achieved when tilt angles 414, 424, 434, and 444 equal −8.5°, 16.8°, 8.5°, and −16.8° respectively. Given the value of $n_{vis}$, and desired scaling factor of 0.8, a seventeen-degree apex angle results in illumination 116 being normally incident on front facet 415 of prism 410.

Prisms of beam shaper 400 may be oriented to yield a different value of magnification $M_y$, which equals $H_2/H_1$. For example, when rod aspect ratio 131 equals 2.39 and displayed aspect ratio 176 equals 1.9, an advantageous magnification is again rod aspect ratio 131 divided by displayed aspect ratio 176, or $M_y$=1.25. When $M_y$=1.25, beam shaper 400 scales the height of illumination 116 (in the y direction) by a factor of 1.25 and the aspect ratio of panel illumination 117 matches displayed aspect ratio 176. Tilt angles 414-444 for this $M_y$=1.25 configuration are the same as the $M_y$=0.8 configuration, but with reversed order and sign: tilt angles 414, 424, 434, and 444 equal 16.8°, −8.5°, −16.8°, and 8.5° respectively.

Prisms of beam shaper 400 may be oriented such that the height $H_2$ of panel illumination 117 exiting beam shaper 400 equals, within a tolerance δ, height $H_1$ of illumination 116, or $H_2 = M_y H_1$, where $|M_y - 1| < \delta$. Hereinafter, $H_2 \approx H_1$ and $M_y \approx 1$ denotes a prism configuration where $H_2 = M_y H_1$, where $|M_y - 1| < \delta$, where δ=0.02.

Figure 5:
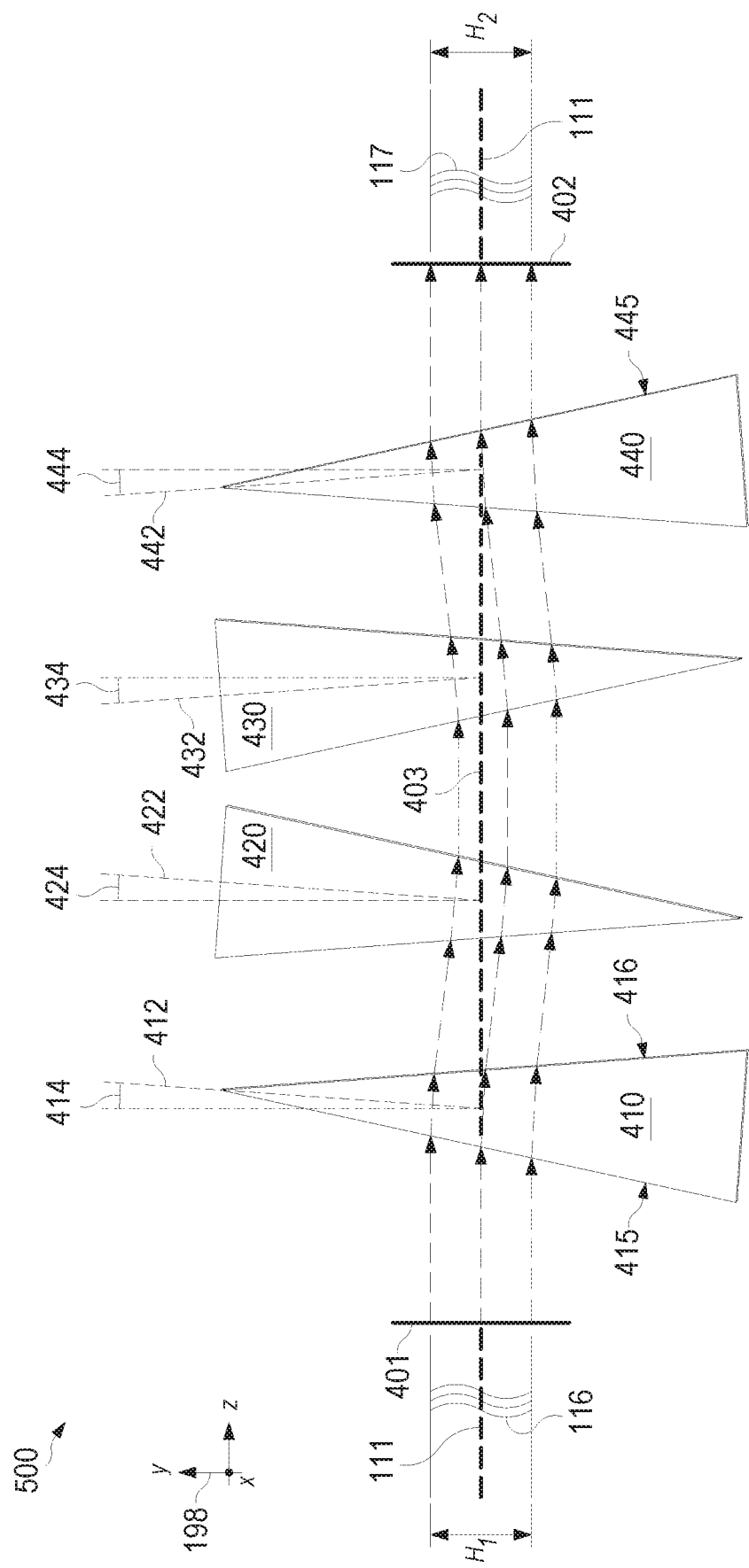
FIG. 5 is a cross-sectional schematic of illumination incident on a delay line, in an embodiment.

FIG. 5 is a cross-sectional schematic of illumination 116 incident on a delay line 500 configured to yield $H_2 \approx H_1$. Delay line 500 is an example of beam shaper 400. In the following configurations of delay line 500, prisms 410-440 are identical, have a 17-degree apex angle, and refractive index $n_{vis}$. In a first configuration, angles 414 and 424 both equal four degrees while tilt angles 414 and 424 both equal negative four degrees, and $M_y \approx 1$. In a second configuration, tilt angles 414, 424, 434, and 444 equal +4°, 0°, −4°, and 0°, respectively, and $M_y$=1.1.

One or more of prisms 410-440 may be translated along its respective symmetry axis 412-442 (or more generally, parallel to the y direction) to change the total optical path length through delay line 500 between planes 401 and 402. This prism translation enables precise focusing of illumination 117 on image panel 170. Projection optics 145 may include delay line 500, in which case prism translation enables precise focusing of projected image 195 on screen 190. Opto-mechanics 104 may include an actuator 152 mechanically coupled to one of prisms 410-440 for translating the prism along its symmetry axis. Actuator 152 may be controlled by processor 310 executing instructions 322. Actuator 152 may be part of actuator 151.

In embodiments of projectors 100 and 300, beam shaper 400 is along beam path 111 in both the first configuration ($H_2 \approx H_1$) and the second configuration $H_2 \neq H_1$. In the first configuration, beam shaper 400 is configured as delay line 500. In the second configuration, beam shaper 400 is configured to change the aspect ratio of illumination 116 in the y direction. Actuator 152 may be configured to change beam shaper 400 between the first configuration and the second configuration by changing at least one of tilt angles 414-444 while maintaining the location of beam shaper 400 along beam path 111.

Figure 6:
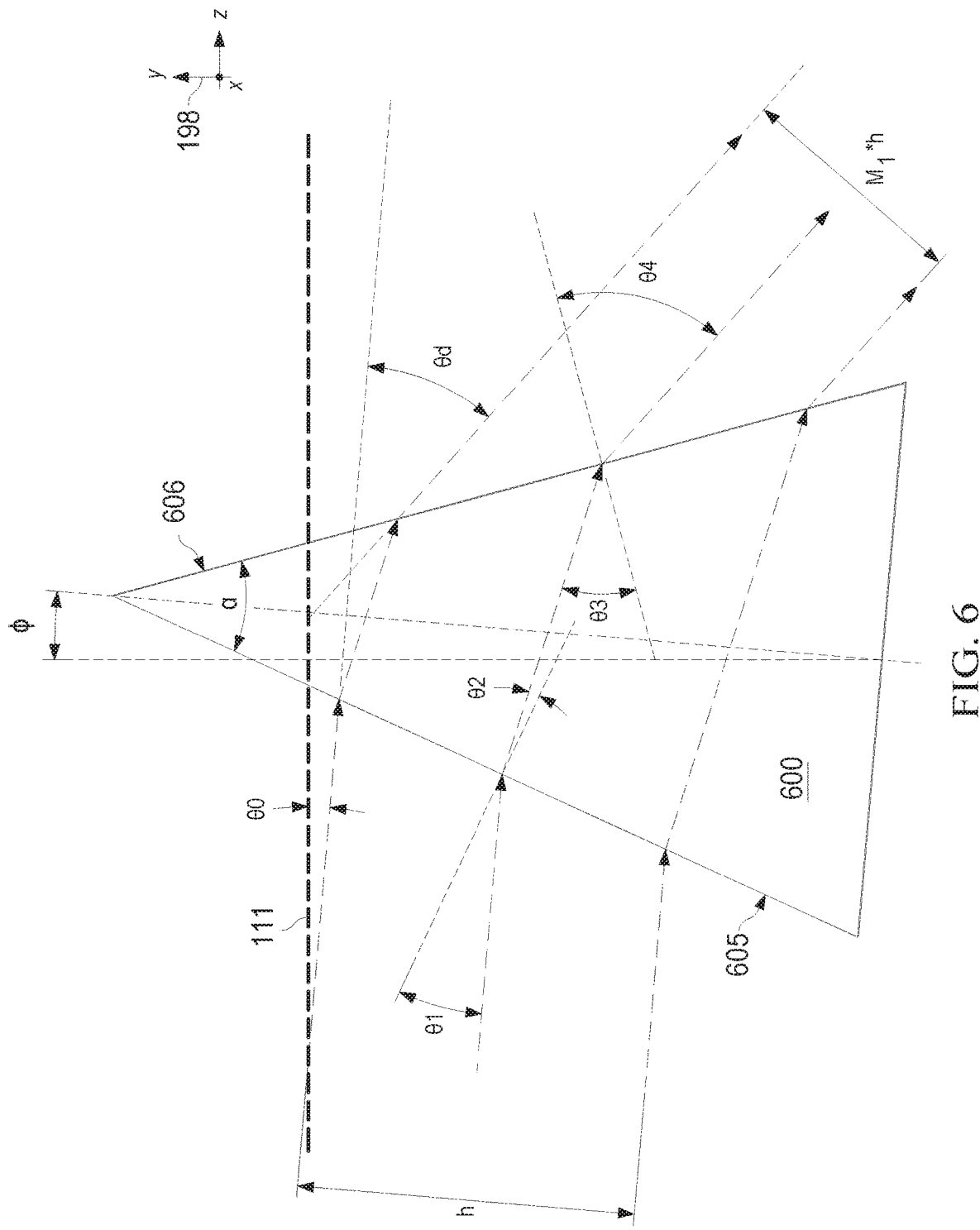
FIG. 6 is a schematic cross-sectional diagram of a prism illustrating incident, refracted and transmitted angles of illumination propagating therethrough.

FIG. 6 is a schematic cross-sectional diagram of prism 600 refracting incident illumination 616 as transmitted illumination 617. Prism 600 is an example of one or more of prisms 410-440. Illumination 616 and 617 are examples of illumination 116 and 117, respectively. Illumination 616 is incident thereon at an incident angle $\theta_0$ and incident angle $\theta_1$. Incident angles $\theta_0$ and $\theta_1$ are, respectively, the incident angle of illumination 116 with respect to optical axis 603 and the normal to front facet 605 of prism 600. Optical axis 603 is equivalent to optical axis 403, FIG. 4, and is parallel to the z direction.

Prism 600 has refractive index n, an apex angle α and deflects the incident beam by a beam deviation angle $\theta_d$. Prism 600 has front and rear facets 605 and 606, respectively, which are examples of front and rear facets 415 and 416, respectively. Beam deviation angle $\theta_d$ is a function of incident angles $\theta_1$ and $\theta_3$ and refracted angles $\theta_2$ and $\theta_4$: $\theta_d = (\theta_1 - \theta_2) + (\theta_4 - \theta_3)$. Apex angle α may equal the sum of $\theta_2$ and $\theta_3$. In FIG. 6, the beam incident on front facet 605 has a beam height h, and exits prism 600 with a beam height $M_1 h$, where equation (1a) is an expression for single-prism magnification $M_1$.

$$M_1 = \frac{\cos \theta_2}{\cos \theta_1} \cdot \frac{\cos \theta_4}{\cos \theta_3} \quad (1a)$$

Per equation (1a), single-prism magnification $M_1$ equals one when $\theta_4$ equals $\theta_1$ and $\theta_3$ equals $\theta_2$.

Single-prism magnification $M_1$ may be expressed as a function of refractive index n, apex angle α, and incident angle $\theta_1$, as shown equations (1b) and (1c), reproduced from Kasuya, T., Suzuki, T. & Shimoda, K. *Appl. Phys.* (1978) 17: 131.

$$M_1 = \sec \theta_1 (n^2 - \sin^2 \theta_1)^{0.5} \cdot \{1 - [f(\theta_1, n, \alpha)]^2\}^{0.5} \{n^2 - [f(\theta_1, n, \alpha)]^2\}^{-0.5} \quad (1b)$$

$$f(\theta, n, \alpha) = \cos \alpha \sin|\theta| - \sin \alpha \sqrt{n^2 - \sin^2 \theta} \quad (1c)$$

Prism 600 has a tilt angle $\phi_1$ with respect to a vertical plane parallel to the x-y plane. When refracted angle $\theta_2 = \alpha/2$ and tilt angle $\phi_1 = -\alpha/2$, angles $\theta_1$ and $\theta_2$ both equal zero such that incident illumination 117 propagates orthogonally to front facet 605. When refracted angle $\theta_2 = \alpha$ and tilt angle $\phi_1 = \theta_1 - \alpha/2$, angles $\theta_3$ and $\theta_4$ both equal zero such that transmitted illumination 117 propagates orthogonally to rear facet 606.

In the following discussion, angles $\phi_1$, $\phi_2$, $\phi_3$, and $\phi_4$ represent tilt angles 414, 424, 434, and 444 respectively. When prisms 410-440 have the same apex angle α and have the same refractive index n, the following antisymmetric restrictions on tilt angles $\phi_{1-4}$ result in illumination 117 being collinear with illumination 116: $\phi_3 = -\phi_1$ and $\phi_4 = -\phi_2$. Tilt angles 414, 424, 434, and 444 may satisfy the aforementioned antisymmetric restrictions to within a tolerance of two degrees.

Tilt angle 99 $_1$ may equal $(\theta_0 + \theta_1 - \alpha/2)$, in which case equations (2)-(5) below prescribe tilt angles of prisms 410-440 that result in illumination 117 transmitted by beam shaper 400 to be collinear with illumination 116 incident thereon.

$$\phi_1 = \theta_0 + \theta_1 - \alpha/2 \quad (2)$$

$$\phi_2 = -\phi_1 + 2\theta_0 + \theta_d = (\theta_0 + \theta_d) + \alpha/2 - \theta_1 \quad (3)$$

$$\phi_3 = \phi_2 - \theta_d = \theta_0 - \phi_1 \quad (4)$$

$$\phi_4 = -\phi_2 = -(\theta_0 + \theta_d) - \alpha/2 + \theta_1 \quad (5)$$

When incident angle $\theta_0 = 0$ (with respect to optical axis 111), equations (2)-(5) simplify to equations (6)-(9), respectively.

$$\phi_1 = \theta_1 - \alpha/2 \quad (6)$$

$$\phi_2 = -\phi_1 + \theta_d = \theta_d + \alpha/2 - \theta_1 \quad (7)$$

$$\phi_3 = \phi_2 - \theta_d = -\phi_1 = \alpha/2 - \theta_1 \quad (8)$$

$$\phi_4 = -\phi_2 = -\theta_d - \alpha/2 + \theta_1 \quad (9)$$

Tilt angles $\phi_{1-4}$ may satisfy either equations (2)-(5) and/or (6)-(9) to an angular tolerance of ±2°.

When tilt angles $\phi_{1-4}$ satisfy equations (2)-(5) and adjacent prisms point in opposite directions, incident angle $\theta_1$ is the same for each of the four prisms, which results in the four prisms imposing a net magnification $M_1^4$ on illumination transmitted therethrough. For example, prisms 410-440 in beam shaper 400 magnify illumination 116 by $M_y = M_1^4$ such that beam height $H_2$ of illumination 117 equals $M_1^4 H_1$. Tilt angles $\phi_{1-4}$ may be determined to achieve a desired magnification $M_y$ by incorporating equations (1b) and (1c) for single-prism magnification $M_1$ into equations (2)-(5) or equations (6)-(9).

Incident angle $\theta_1$ may be in the range of ten degrees to thirty degrees to achieve a satisfactory tradeoff between magnification $M_y$ and decreased illumination resulting from reflections at prism surfaces. Front and rear surfaces of least one of prisms 410-440 may have an antireflective coating thereon. The antireflective coating may be a multilayer coating designed to minimize reflections of electromagnetic radiation in a spectral range. The spectral range may correspond to visible wavelengths (e.g., 400 nm ≤ $\lambda_0$ ≤ 700 nm), which is applicable to cinema applications, or correspond to infrared wavelengths (e.g., 700 nm ≤ $\lambda_0$ ≤ 1.0 μm), which is applicable to night-vision applications.

Figure 7:
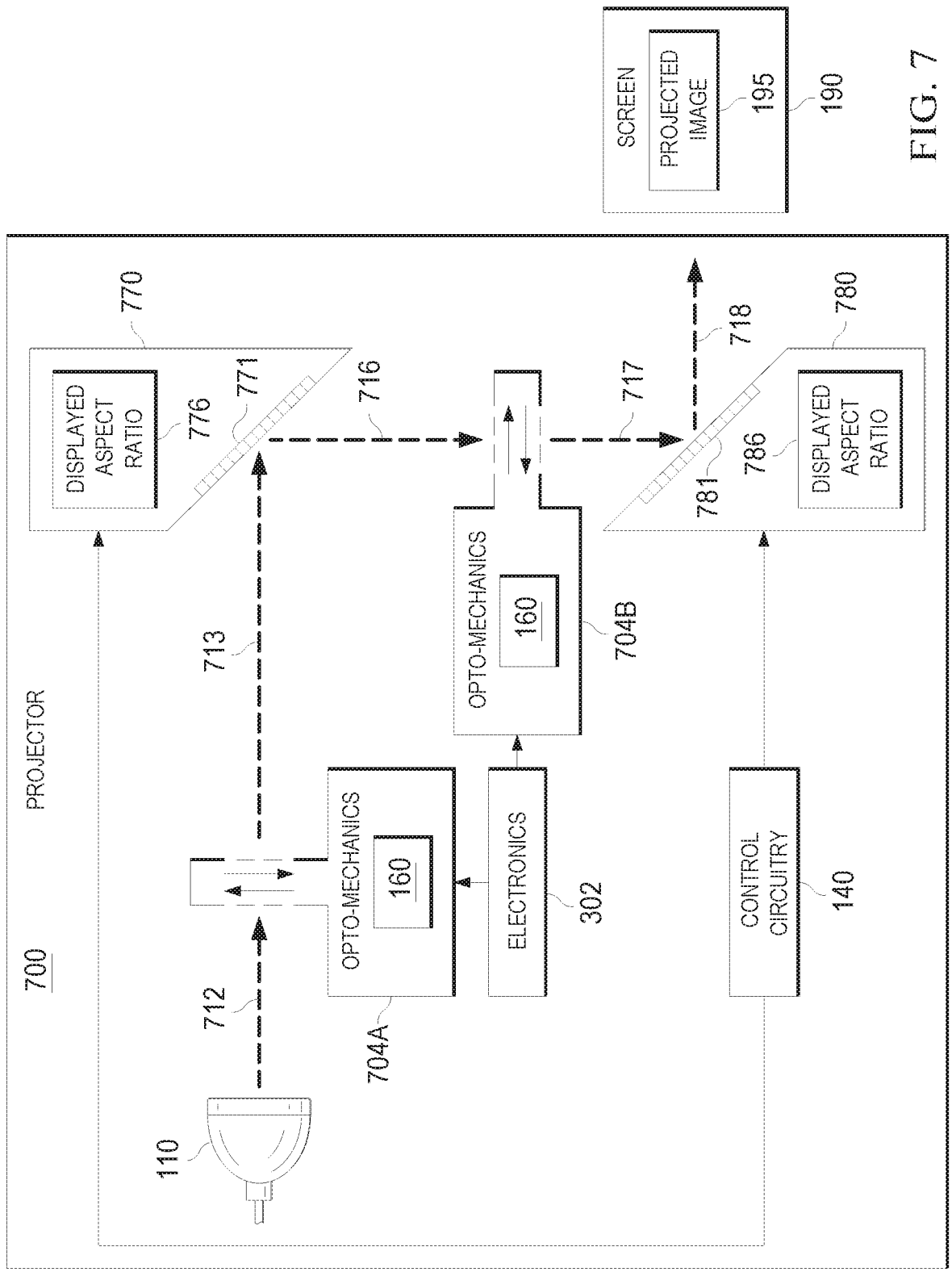
FIG. 7 is a schematic diagram of a projector that includes two image panels and is an example of the projector of FIG. 1, in an embodiment.

FIG. 7 is a schematic diagram of a projector 700, which is an example of projector 100. Projector 700 includes light source 110, control circuitry 140, image panels 770 and 780, electronics 302, and opto-mechanics 704A. Projector 700 may also include opto-mechanics 704B. Image panels 770 and 780 are each examples of image panel 170 and have respective active areas 771 and 781 that display images at respective displayed aspect ratios 776 and 786. Projector 700 includes electronics 302 communicatively coupled with opto-mechanics 704A, which is an example of opto-mechanics 104, FIG. 1.

Light source 110 generates illumination 712, which is incident on active area 771 as illumination 713. Image panel 770 modulates illumination 713 to generate illumination 716, which propagates away from image panel 770 and toward image panel 780. Illumination 716 is incident on active area 781 as modulated illumination 717. Image panel 780 modulates illumination 717 to generate illumination 718, which may form image 195 on screen 190. Illumination 712 and 713 are examples of illumination 116 and 117, respectively. Illumination 716, 717, and 718 are examples of illumination 116, 117, and 118, respectively. Image panel 780 may function to highlight regions of modulated illumination 717, such that illumination 118 forms projected image 195 that includes one or more highlighted regions.

When the aspect ratio of illumination 712 differs from displayed aspect ratio 776, electronics 302 may control opto-mechanics 704A to change the aspect ratio of illumination 712 such that beam shaper 160 transmits illumination 713 having an aspect ratio equal to displayed aspect ratio 776. When the aspect ratio of illumination 716 differs from displayed aspect ratio 786, electronics 302 may control opto-mechanics 704B to change the aspect ratio of illumination 716 such that beam shaper 160 transmits illumination 717 having an aspect ratio equal to displayed aspect ratio 786.

Figure 8:
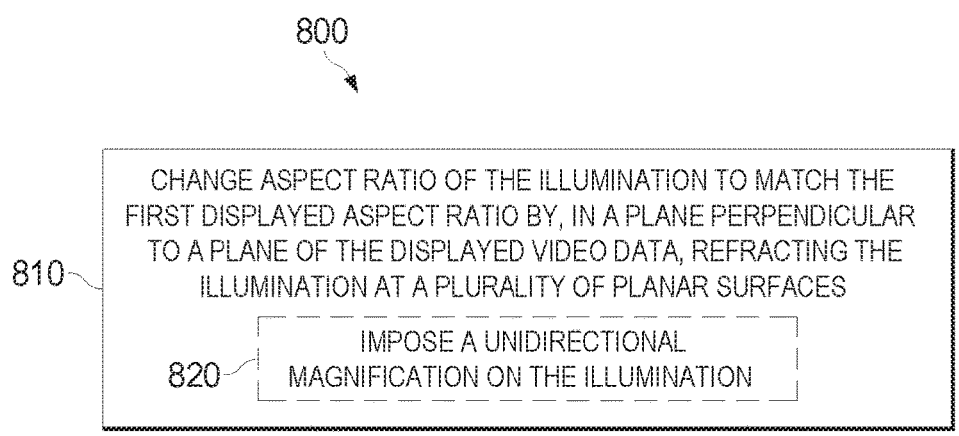
FIG. 8 is a flowchart illustrating a method for increasing projected light intensity of a projector, in an embodiment.

FIG. 8 is a flowchart illustrating a method 800 for increasing projected light intensity of a projector. Method 800 includes step 810, and may be implemented by any of projectors 100, 300, and 700 disclosed herein. The projector includes an integrating rod that has a rod aspect ratio.

Step 810 includes, when illumination exiting the integrating rod is incident on an image panel displaying video data at a first displayed aspect ratio that differs from the rod aspect ratio, changing aspect ratio of the illumination to match the first displayed aspect ratio by, in a plane perpendicular to a plane of the displayed video data, refracting the illumination at a plurality of planar surfaces. The refraction may occur along an optical path of the illumination, beam path 111 for example, between the integrating rod and the image panel. In an example of step 810, in which illumination 116 has rod aspect ratio 131 that differs from displayed aspect ratio 176, beam shaper 160 refracts illumination 116 at a plurality of planar surfaces of prisms 162. Beam shaper 160 may be beam shaper 400.

Step 810 may include step 820, which includes imposing a unidirectional magnification on the illumination. In an example of step 820, beam shaper 160 imposes a unidirectional magnification $M^K$ on illumination 116 in the y direction, where magnification M is a function of angles $\theta_{1-4}$ as described above and K is the number of identical prisms that constitute beam shaper 160.

Combinations of Features

Features described above as well as those claimed below may be combined in various ways without departing from the scope hereof. The following enumerated examples illustrate some possible, non-limiting combinations.

(A1) A projector includes a light source, an integrating rod, an image panel, a beam shaper, and an actuator mechanically connected to the beam shaper. The light source is configured to generate illumination. The integrating rod has a rod aspect ratio at a first end. The image panel is configured to display an image at a displayed aspect ratio. The beam shaper includes multiple prisms shaped and oriented such that when the beam shaper intersects an optical path of the illumination between the integrating rod and the image panel, the illumination transmitted by the beam shaper is collinear with the illumination incident on the beam shaper. The actuator is configured to switch the projector between (i) a first configuration, in which the beam shaper does not change an aspect ratio of the illumination, and (ii) a second configuration, in which the beam shaper intersects the optical path between the integrating rod and the image panel and changes the aspect ratio of the illumination. The illumination transmitted by the beam shaper may have an aspect ratio equal to the displayed aspect ratio, which increases the intensity of illumination incident on the displayed image.

(A2) In projector (A1), in the second configuration, the multiple prisms may be shaped and oriented to impose a unidirectional magnification M on the illumination axially propagating therethrough, and magnification M may be equal to the displayed aspect ratio divided by the rod aspect ratio.

(A3) In either of projectors (A1) and (A2), in the first configuration: (i) the multiple prisms being shaped and oriented to impose no magnification or impose a unidirectional magnification M, where |1−M| may be less than 0.1 and (ii) along the optical path, the beam shaper may be between the integrating rod and the image panel.

(A4) Any of projectors (A1)-(A3) may further include a processor coupled to the actuator, and a memory. The memory stores machine-readable instructions that, when executed by the processor, control the actuator to: put the projector in the first configuration when the rod aspect ratio equals the displayed aspect ratio, and put the projector in the second configuration when the rod aspect ratio differs from the displayed aspect ratio.

(A5) In any of projectors (A1)-(A4) the beam shaper may be outside the optical path in the first configuration.

(A6) Any of projectors (A5) wherein in the second configuration, the illumination traverses a respective optical path length through each prism, may further include a transparent cuboid and an actuator. The transparent cuboid has a length L, between a front surface and a rear surface thereof, and refractive index n such that an optical path length nL equals a sum of the respective optical path lengths. The actuator is mechanically connected to the transparent cuboid such that in the first configuration, the optical path traverses the transparent cuboid and is orthogonal to the front surface and the rear surface.

(A7) In any of projectors (A1)-(A6), the multiple prisms may include a first prism that, in the second configuration, is between the integrating rod and remaining prisms of the beam shaper, and a facet of the first prism may be orthogonal to and intersecting the optical path.

(A8) In any of projectors (A1)-(A7), the multiple prisms may include four identical prisms $P_1$, $P_2$, $P_3$, and $P_4$ having an apex angle $\alpha$ and being tilted at respective angles $\phi_1$, $\phi_2$, $\phi_3$, and $\phi_4$ in a plane parallel to the optical path of the illumination incident on prism $P_1$ and transmitted by prism $P_4$, where to within a two-degree tolerance, $\phi_3 = -\phi_1$ and $\phi_4 = \phi_2$.

(A9) In any of projectors (A8), angles $\phi_1$ and $\phi_2$ may satisfy, within a two-degree tolerance, $\phi_1 = \alpha/2$ and $\phi_2 = -\phi_1 + \theta_d$, where $\theta_d$ is the deviation angle imparted by prism $P_1$.

(A10) In any of projectors (A1)-(A9), the multiple prisms may include a first pair of identical prisms and a second pair of identical prisms rotated, with respect to the first pair of identical prisms, by an angle about an axis parallel to the optical path of the illumination incident on prism $P_1$, the angle being between 170° and 190°.

(A11) In any of projectors (A1)-(A10), the actuator may be configured to switch the projector between the first configuration and the second configuration by moving the beam shaper in a circular trajectory that intersects the optical path.

(A12) In any of projectors (A1)-(A11), the actuator may be configured to switch the projector between the first configuration and the second configuration by moving the beam shaper in a linear trajectory that intersects the optical path.

(A13) Any of projectors (A1)-(A12), may further include relay optics configured to steer the illumination along the optical path through the integrating rod and to the image panel, the optical path axially traversing the integrating rod.

(B1) A projector includes a light source, a delay line including multiple prisms, and an actuator mechanically connected to a first prism of the multiple prisms. The light source is configured to generate illumination propagating along an optical path. The delay line intersects the optical path and includes multiple prisms shaped and oriented such that the illumination transmitted by the beam shaper is (i) collinear with the illumination incident on the beam shaper and (ii) magnified by a near-unity factor M, where $|1-M|<0.1$. The actuator is configured to change the optical path length through the delay line by translating the first prism in a direction that is (i) non-parallel to the optical path within the delay line and (ii) in a plane perpendicular to refractive surfaces of the multiple prisms.

(B2) The projector (B1) may further include an image panel, the optical path being incident on the image panel after axially traversing the delay line.

(B3) Any of projectors (B1) and (B2) may further include relay optics configured to steer the illumination through the delay line and to the image panel.

(B4) In any of projectors (B1)-(B3), the multiple prisms may include four identical prisms $P_1$, $P_2$, $P_3$, and $P_4$ having an apex angle $\alpha$ and being tilted at respective angles $\phi_1$, $\phi_2$, $\phi_3$, and $\phi_4$ in a plane parallel to the optical path of the illumination incident on prism $P_1$ and transmitted by prism $P_4$, where to within a two-degree tolerance, $\phi_3 = -\phi_1$ and $\phi_4 = \phi_2$.

(B5) In any of projectors (B1)-(B4), the optical path of the illumination may be incident on prism $P_1$ at an angle $\theta_1$ with respect to normal incidence thereon, angles $\phi_1$ and $\phi_2$ satisfying, to within a two-degree tolerance, $$\phi_1 = \theta_1 - \frac{\alpha}{2} \text{ and } \phi_2 = \phi_1.$$

(C1) A method for increasing projected light intensity of a projector is disclosed. The method may be executed when illumination exiting an integrating rod of the projector, having a rod aspect ratio, is incident on an image panel displaying video data at a first displayed aspect ratio that differs from the rod aspect ratio. The method includes changing an aspect ratio of the illumination to match the first displayed aspect ratio by, in a plane perpendicular to a plane of the displayed video data, refracting the illumination at a plurality of planar surfaces.

(C2) In the method (C1), step of changing may include imposing a unidirectional magnification on the illumination.

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated, the adjective "exemplary" means serving as an example, instance, or illustration. The following claims are intended to cover all generic and specific features described herein, as well as all statements of the scope of the present method and system, which, as a matter of language, might be said to fall therebetween.

Various aspects of the present invention may be appreciated from the following enumerated example embodiments (EEEs):

1. A projector comprising:
    a light source configured to generate illumination;
    an integrating rod;
    an image panel configured to display an image at a displayed aspect ratio;
    a beam shaper including multiple prisms shaped and oriented such that when the beam shaper intersects an optical path of the illumination between the integrating rod and the image panel, the illumination transmitted by the beam shaper is collinear with the illumination incident on the beam shaper;
    an actuator mechanically connected to the beam shaper and configured to switch the projector between (i) a first configuration, in which the beam shaper does not change an aspect ratio of the illumination, and (ii) a second configuration, in which the beam shaper intersects the optical path between the integrating rod and the image panel and changes the aspect ratio of the illumination.
2. The projector of EEE 1, the integrating rod having a rod aspect ratio at a first end, and in the second configuration, the multiple prisms being shaped and oriented to impose a unidirectional magnification M on the illumination axially propagating therethrough, magnification M being equal to the displayed aspect ratio divided by the rod aspect ratio.
3. The projector of EEE 1 or EEE 2, in the first configuration: (i) the multiple prisms being shaped and oriented to impose no magnification or impose a unidirectional magnification M, where |1−M|<0.1 and (ii) along the optical path, the beam shaper is between the integrating rod and the image panel.
4. The projector of any of EEE 1-3, the integrating rod having a rod aspect ratio at a first end, and further comprising:
a processor coupled to the actuator; and
a memory storing machine-readable instructions that, when executed by the processor, control the actuator to:
put the projector in the first configuration when the rod aspect ratio equals the displayed aspect ratio, and
put the projector in the second configuration when the rod aspect ratio differs from the displayed aspect ratio.
5. The projector of any of EEE 1-4, in the first configuration, the beam shaper being outside the optical path.
6. The projector of EEE 5, in the second configuration, the illumination traversing a respective optical path length through each prism, and the projector further comprising:
a transparent cuboid having a length L, between a front surface and a rear surface thereof, and refractive index n such that an optical path length nL equals a sum of the respective optical path lengths,
the actuator being mechanically connected to the transparent cuboid such that in the first configuration, the optical path traverses the transparent cuboid and is orthogonal to the front surface and the rear surface.
7. The projector of any of EEE 1-6, the multiple prisms including a first prism that, in the second configuration, is between the integrating rod and remaining prisms of the beam shaper, and a facet of the first prism being orthogonal to and intersecting the optical path.
8. The projector of any of EEE 1-7, the multiple prisms including four identical prisms $P_1$, $P_2$, $P_3$, and $P_4$ having an apex angle $\alpha$ and being tilted at respective angles $\phi_1$, $\phi_2$, $\phi_3$, and $\phi_4$ in a plane parallel to the optical path of the illumination incident on prism $P_1$ and transmitted by prism $P_4$, where to within a two-degree tolerance, $\phi_3 = -\phi_1$ and $\phi_4 = -\phi_2$.
9. The projector of EEE 8, angles $\theta_1$ and $\phi_2$ satisfying, within a two-degree tolerance, $\phi_1 = \alpha/2$ and $\phi_2 = -\phi_1 + \theta_d$, where $\theta_d$ is the deviation angle imparted by prism $P_1$.
10. The projector of any of EEE 1-9, the multiple prisms including a first pair of identical prisms and a second pair of identical prisms rotated, with respect to the first pair of identical prisms, by an angle about an axis parallel to the optical path of the illumination incident on prism $P_1$, the angle being between 170° and 190°.
11. The projector of any of EEE 1-10, the actuator being configured to switch the projector between the first configuration and the second configuration by moving the beam shaper in a circular trajectory that intersects the optical path.
12. The projector of any of EEE 1-11, the actuator being configured to switch the projector between the first configuration and the second configuration by moving the beam shaper in a linear trajectory that intersects the optical path.
13. The projector of any of EEE 1-12, further comprising relay optics configured to steer the illumination along the optical path through the integrating rod and to the image panel, the optical path axially traversing the integrating rod.
14. A projector comprising:
a light source configured to generate illumination propagating along an optical path;
a delay line intersecting the optical path and including multiple prisms shaped and oriented such that the illumination transmitted by the beam shaper is (i) collinear with the illumination incident on the beam shaper and (ii) magnified by a near-unity factor M, where |1−M|<0.1;
an actuator mechanically connected to a first prism of the multiple prisms and configured to change the optical path length through the delay line by translating the first prism in a direction that (i) is non-parallel to the optical path within the delay line and (ii) is in a plane perpendicular to refractive surfaces of the multiple prisms.
15. The projector of EEE 14, further comprising an image panel, the optical path being incident on the image panel after axially traversing the delay line.
16. The projector of EEE 15, further comprising relay optics configured to steer the illumination through the delay line and to the image panel.
17. The projector of any of EEE 14-16, the multiple prisms including four identical prisms $P_1$, $P_2$, $P_3$, and $P_4$ having an apex angle $\alpha$ and being tilted at respective angles $\phi_1$, $\phi_2$, $\phi_3$, and $\phi_4$ in a plane parallel to the optical path of the illumination incident on prism $P_1$ and transmitted by prism $P_4$, where to within a two-degree tolerance, $\phi_3 = -\phi_1$ and $\theta_4 = -\phi_2$.
18. The projector of EEE 17, the optical path of the illumination being incident on prism $P_1$ at an angle $\theta_1$ with respect to normal incidence thereon, angles $\phi_1$ and $\phi_2$ satisfying, to within a two-degree tolerance, $$\phi_1 = \theta_1 - \frac{\alpha}{2} \text{ and } \phi_2 = \phi_1.$$

19. A method for increasing projected light intensity of a projector comprising, when illumination exiting an integrating rod of the projector, having a rod aspect ratio, is incident on an image panel displaying video data at a first displayed aspect ratio that differs from the rod aspect ratio:
changing an aspect ratio of the illumination to match the first displayed aspect ratio by, in a plane perpendicular to a plane of the displayed video data, refracting the illumination at a plurality of planar surfaces.
20. The method of EEE 19, step of changing comprising imposing a unidirectional magnification on the illumination.

The invention claimed is:
1. A projector comprising:
a light source configured to generate illumination;
an integrating rod;
an image panel configured to display an image at a displayed aspect ratio;
a beam shaper including multiple prisms shaped and oriented such that when the beam shaper intersects an optical path of the illumination between the integrating rod and the image panel, the illumination transmitted by the beam shaper is collinear with the illumination incident on the beam shaper;

an actuator mechanically connected to the beam shaper and configured to switch the projector between (i) a first configuration, in which the beam shaper does not change an aspect ratio of the illumination, and (ii) a second configuration, in which the beam shaper intersects the optical path between the integrating rod and the image panel and changes the aspect ratio of the illumination, wherein the multiple prisms include four identical prisms $P_1$, $P_2$, $P_3$, and $P_4$ having an apex angle $\alpha$ and being tilted at respective angles $\phi_1$, $\phi_2$, $\phi_3$, and $\phi_4$ in a plane parallel to the optical path of the illumination incident on prism $P_1$ and transmitted by prism $P_4$, where to within a two-degree tolerance, $\phi_3 = -\phi_1$ and $\phi_4 = -\phi_2$.

2. The projector of claim 1, the integrating rod having a rod aspect ratio at a first end, and in the second configuration, the multiple prisms being shaped and oriented to impose a unidirectional magnification M on the illumination axially propagating therethrough, magnification M being equal to the displayed aspect ratio divided by the rod aspect ratio.

3. The projector of claim 1, in the first configuration: (i) the multiple prisms being shaped and oriented to impose no magnification or impose a unidirectional magnification M, where $|1-M|<0.1$ and (ii) along the optical path, the beam shaper is between the integrating rod and the image panel.

4. The projector of claim 3, further comprising:

an actuator mechanically connected to a first prism of the multiple prisms and configured to change the optical path length through the beam shaper by translating the first prism in a direction that (i) is non-parallel to the optical path within the delay line and (ii) is in a plane perpendicular to refractive surfaces of the multiple prisms.

5. The projector of claim 4, further comprising:

an image panel, the optical path being incident on the image panel after axially traversing the beam shaper; and relay optics configured to steer the illumination through the beam shaper and to the image panel.

6. The project of claim 1, wherein the beam shaper, in the first configuration, is outside the optical path.

7. The projector of claim 6, in the second configuration, the illumination traversing a respective optical path length through each prism, and the projector further comprising:

a transparent cuboid having a length L, between a front surface and a rear surface thereof, and refractive index n such that an optical path length nL equals a sum of the respective optical path lengths, the actuator being mechanically connected to the transparent cuboid such that in the first configuration, the optical path traverses the transparent cuboid and is orthogonal to the front surface and the rear surface.

8. The projector of claim 6, the actuator being configured to switch the projector between the first configuration and the second configuration by moving the beam shaper in a circular trajectory that intersects the optical path.

9. The projector of claim 6, the actuator being configured to switch the projector between the first configuration and the second configuration by moving the beam shaper in a linear trajectory that intersects the optical path.

10. The projector of claims 1, the integrating rod having a rod aspect ratio at a first end, and further comprising:

a processor coupled to the actuator; and a memory storing machine-readable instructions that, when executed by the processor, control the actuator to:
put the projector in the first configuration when the rod aspect ratio equals the displayed aspect ratio, and
put the projector in the second configuration when the rod aspect ratio differs from the displayed aspect ratio.

11. The projector of claim 1, the multiple prisms including a first prism that, in the second configuration, is between the integrating rod and remaining prisms of the beam shaper, and a facet of the first prism being orthogonal to and intersecting the optical path.

12. The projector of claims 1, angles $\phi_1$ and $\phi_2$ satisfying, within a two-degree tolerance, $\phi_1 = \alpha/2$ and $\phi_2 = -\phi_1 + \theta_d$, where $\theta_d$ is the deviation angle imparted by prism $P_1$.

13. The projector of claim 1, the multiple prisms including a first pair of identical prisms and a second pair of identical prisms rotated, with respect to the first pair of identical prisms, by an angle about an axis parallel to the optical path of the illumination incident on prism $P_1$, the angle being between 170° and 190°.

14. The projector of claim 1, further comprising relay optics configured to steer the illumination along the optical path through the integrating rod and to the image panel, the optical path axially traversing the integrating rod.

* * * * *

UNITED STATES PATENT AND TRADEMARK OFFICE
CERTIFICATE OF CORRECTION

| | | |
|---|---|---|
| PATENT NO. | : 11,868,032 B2 | Page 1 of 1 |
| APPLICATION NO. | : 17/423685 | |
| DATED | : January 9, 2024 | |
| INVENTOR(S) | : Khaydarov et al. | |

It is certified that error appears in the above-identified patent and that said Letters Patent is hereby corrected as shown below:

On the Title Page

Page 2, Column 2, FOREIGN PATENT DOCUMENTS:
Line 7, Delete "GN" and insert --CN--

In the Claims

Column 15, Line 42, in Claim 6, delete "project" and insert --projector--

Column 16, Line 17, in Claim 10, delete "claims" and insert --claim--

Column 16, Line 33, in Claim 12, delete "claims" and insert --claim--

Signed and Sealed this
Tenth Day of December, 2024

Katherine Kelly Vidal
*Director of the United States Patent and Trademark Office*